United States Patent [19]
Van Gorkom et al.

[11] Patent Number: 5,442,253
[45] Date of Patent: * Aug. 15, 1995

[54] THIN-TYPE PICTURE DISPLAY DEVICE

[75] Inventors: Gerardus G. P. Van Gorkom; Petrus H. F. Tormpenaars, both of Eindhoven, Netherlands

[73] Assignee: U.S. Philips Corporation, New York, N.Y.

[ * ] Notice: The portion of the term of this patent subsequent to May 17, 2011 has been disclaimed.

[21] Appl. No.: 210,962

[22] Filed: Mar. 21, 1994

Related U.S. Application Data

[63] Continuation of Ser. No. 830,951, Feb. 6, 1992, Pat. No. 5,313,136, which is a continuation of Ser. No. 528,677, May 24, 1990, abandoned.

[30] Foreign Application Priority Data

Jan. 6, 1989 [NL] Netherlands .......................... 8901391
Jan. 10, 1990 [NL] Netherlands .......................... 9000060

[51] Int. Cl.⁶ ............................................. H01J 29/70
[52] U.S. Cl. ..................................... 313/422; 313/497; 313/103; 313/105 CM

[58] Field of Search ........ 313/422, 495, 497, 105 CM, 313/103 CM, 496; 315/366

[56] References Cited

U.S. PATENT DOCUMENTS

5,313,136 5/1994 Van Gorkom et al. ............ 313/422

Primary Examiner—Donald J. Yusko
Assistant Examiner—N. D. Patel
Attorney, Agent, or Firm—Robert J. Kraus

[57] ABSTRACT

Picture display device having a vacuum envelope for displaying pictures composed of pixels on a luminescent screen, comprising a plurality of juxtaposed sources for producing electrons, local electron ducts cooperating with the sources and having walls of electrically insulating material with a secondary emission coefficient suitable for electron transport for transporting, through vacuum, produced electrons in the form of electron currents through juxtaposed trajectories at a short distance from the luminescent screen, and means for withdrawing each electron current at predetermined locations from its duct and directing it towards a desired location on the luminescent screen for producing a picture composed of pixels.

5 Claims, 9 Drawing Sheets

THIN-TYPE PICTURE DISPLAY DEVICE

This is a continuation of prior application Ser. No. 07/830,951 now U.S. Patent No. 5,313,136 filed on 6 Feb. 1992, which is a continuation of prior application 07/528,677, filed on 24 May 1990 now abandoned.

BACKGROUND OF THE INVENTION

The invention relates to a picture display device having a vacuum envelope for displaying pictures composed of pixels on a luminescent screen, and particularly relates to a thin picture display device (i.e. a picture display device having a small "front to back dimension") which is clearly distinguished from state of the art display devices.

Typical state of the art approximations to thin-type picture display devices are devices having a transparent face plate whose inner side is provided with a phosphor pattern, one side of which is provided with an electrically conducting coating (the combination also being referred to as luminescent screen). If (video information-controlled) electrons impinge upon the luminescent screen, a visual image is formed which is visible via the front side of the face plate. The face plate may be flat or, if desired, curved (for example, spherical or cylindrical).

In a first category of thin-type picture display devices a number of thermally heated wire cathodes is arranged in a plane parallel to the luminescent screen at a location within the picture display device remote from the screen, which cathodes are responsible for producing the required electrons. The electrons produced may be present in the form of an electron cloud. In order to cause the electrons to impinge upon specific locations on the luminescent screen for forming a picture in such a device, the required electron current must be withdrawn from the cloud. This requires a stack form of addressing electrodes, (a buffer electrode), focusing electrodes, and in some cases deflection means. A problem which has hitherto occurred in such picture display devices is that they exhibit visual brightness variations.

Another category of picture display devices of the thin type uses single or multiple electron beams which initially extend substantially parallel to the plane of the display screen and are ultimately bent towards the display screen so as to address the desired areas of the luminescent screen either directly or by means of, for example a selection grid structure. (The expression electron beam is understood to mean that the paths of the electrons in the beam are substantially parallel, or extend only at a small angle to one another and that there is a main direction in which the electrons move.) The above-mentioned devices require, inter alia, complicated electron-optical constructions.

Moreover, picture display devices of the single beam type generally require a complicated (channel plate) electron multiplier of the matrix type, certainly if they have slightly larger screen formats.

A more extensive survey of the drawbacks of thin-type state of the art picture display devices has been given in EP-A 213,839, corresponding to U.S. Pat. No. 4,719,388.

SUMMARY OF THE INVENTION

In view of the foregoing it is an object of the invention to provide a thin-type picture display device which substantially does not have the drawbacks of the known devices.

According to the invention, a picture display device having a vacuum envelope for displaying pictures composed of pixels on a luminescent screen therefore comprises a plurality of juxtaposed sources for producing electrons, local electron ducts cooperating with the sources and having walls of electrically insulating material with a secondary emission coefficient suitable for electron transport for transporting, through vacuum, produced electrons in the form of electron currents through juxtaposed trajectories at a short distance from the luminescent screen, and means for withdrawing each electron current at predetermined (particularly successive) locations from its duct and directing it towards a desired location on the luminescent screen for producing a picture composed of pixels.

The inventive approach of providing a thin-type picture display device is based on the discovery that electron transport is found to be possible in an elongate evacuated cavity (so-called compartment) surrounded by walls of electrically insulating material (for example glass) if an electric field of sufficient power is realised in the longitudinal direction of the compartment (by applying an electric potential difference across the ends of the compartment). As will be further described, the circumstances (field strength E, electrical resistance of the walls, secondary emission coefficient $\delta$ of the walls) may be chosen to be such that a constant vacuum current will flow in the compartment. To enable an electron current to leave a compartment at desired (successive) locations in the direction of the luminescent screen, the compartment wall facing the luminescent screen may be provided with a row of apertures combined with electrodes which are energisable by means of a first (positive) electric voltage so as to withdraw an electron current from the compartment via an aperture, or which are energisable by means of a second electric voltage if no electrons are to be locally withdrawn from the compartment.

The above-mentioned recognition is used in a first embodiment of the device according to the invention which is characterized in that the electron ducts are constituted by elongate cavities defined by walls of electrically insulating material having a secondary emission coefficient $\delta$, the walls being provided with electrode means for applying an electric field in the longitudinal direction of the cavities, said field having a field strength E and the wall of each cavity facing the luminescent screen being provided with a plurality of apertures such that all apertures jointly constitute an arrangement of rows and columns. In this case $\delta$ and E have values which enable electron transport through the cavities. The advantages which can be achieved thereby will hereinafter be explained in greater detail.

For generating electron currents to be transported through the vacuum in the electron ducts it is possible to use a (line) arrangement of a plurality of electron emitters parallel to (an edge of) the luminescent screen. Thermal cathodes and cold cathodes such as field emitters are suitable for this purpose.

Different ways of transporting electrons through the vacuum are possible within the scope of the invention. There may be electron guidance only, or there may be electron amplification, in combination with electron guidance, over a part (particularly the initial part) or over the entire duct length. If there is amplification in the electron ducts, each emitter only needs to supply a small amount of current (for example of the order of nA). The emitter arrangement may comprise, for example one row placed adjacent to an edge of the luminescent screen on the bottom of a narrow high box one of whose main surfaces constitutes the display panel. Alternatively, the emitter arrangement may have n mutually parallel rows placed at such distances from the bottom of the box that the electron currents produced by them in operation jointly scan the entire height of the display panel. (If, in the special case, n=1, the emitter arrangement is placed midway between two parallel edges of the luminescent screen). As will be further explained, the advantage of this alternative is that the maximum potential difference required for generating the electric field, which is necessary for electron guidance, can be smaller than when placing one emitter arrangement on the bottom.

All electron currents generated by emitters should be guided in the electron ducts across at least a part of the height of the "box" towards the upper edge or the lower edge of the luminescent screen.

The electron emitters may be placed within the electron duct with which they cooperate, but they are preferably each located at the outer side opposite to an entrance portion of the electron duct with which they cooperate.

By applying a sufficiently large positive voltage difference between an emitter and the end of an electron duct cooperating therewith, electrons emitted by the emitter are accelerated towards the electron duct, whereafter they generate secondary electrons in the electron duct by means of wall interaction. This process may be adjusted in such a way that a constant vacuum current will flow through the relevant electron duct.

A row arrangement of electrodes may be provided at the side of the apertured walls facing the luminescent screen for the purpose of electron transport and/or (picture) line selection. This means that the supply of (linearly) increasing voltages to the electrodes enables the axial electric field required for electron transport to be generated, and the supply of a suitable voltage pulse enables the apertures to be controlled line-sequentially so as to make it possible or impossible for each electron current to leave its electron duct through its associated aperture of a row. Electrons which are withdrawn linewise from the electron ducts are accelerated towards the luminescent screen by providing a sufficiently large voltage difference between the electron ducts and the screen, for example, a difference of 3 kV. Thus, it is possible to write one picture line at a time. The video information (grey levels) may be presented in the form of, for example, pulse width modulation. The distance to the screen may be very small so that the spot remains small. Individual electron beams accelerated towards the screen can be localised by providing an electron beam localisation structure, e.g. in the form of a (wafer) structure of walls, between the electron ducts and the luminescent screen or, which is simpler, by providing a spacer plate which has apertures which are coaxial with the extraction apertures in the electron ducts.

To prevent unwanted spontaneous emission of electrons towards the screen, which could give rise to luminescence at unwanted locations, it may be advantageous to bury the electrodes of the electrode arrangement in electrically insulating material.

To improve the contrast of the produced picture, the electrodes of the electrode arrangement may have a double construction. To this end, for example a synthetic material foil (for example, a kapton foil) may be used, which has an electrode pattern on both sides, which electrode patterns correspond to each other.

To prevent charging of the walls of the localisation structure, the localisation structure may comprise a plurality of hollow electrode means enclosing the path of each individual electron beam and being electrically connected to the electrodes of the electrode arrangement. These electrode means may be self-supporting cylindrical or conical metal components, or metallic layers which are vapour-deposited on the inner side of a hollow insulating auxiliary structure. If the above-mentioned electrode means are formed in two parts, they may be used for colour selection by energising them separately, as will be further described. For example, they may comprise two parallel plates which may have all apertures of a row in common.

For a uniform electron transport in the electron ducts (substantially linearly) increasing voltages are applied to the electrodes of the electrode arrangement, whereby in the axial direction the strength of the longitudinal electric transport field varies correspondingly.

To ensure that the electrons leave the electron ducts only where this is desired due to the supply of a positive voltage pulse to a selection electrode, it is important to provide means ensuring that the (axial) variation of the longitudinal electric (transport) field generated in operation is substantially uniform. A suitable possibility is to provide a high-ohmic resistance layer on at least one wall of each compartment constituting an electron duct, for example on the front and/or rear wall or on the two side walls. To increase the resistance, this resistance layer may have a meandering pattern.

If a number of electrons were to acquire too high velocities during transport through the electron ducts, this could lead to a loss of contrast. Too high velocities may occur due to elastic collisions with the walls (backscattering) or because electrons, which start at a low velocity, do not come into contact with the walls and gain more and more energy on their way. To prevent this, the electron ducts may be provided with, for example geometrical obstacles so as to give substantially uniform velocities to the electrons transported in these ducts.

A very interesting aspect of the invention is that the selection electrodes may be capacitively driven so that the number of required vacuum leadthroughs may be relatively small. If according to a preferred embodiment the electron emitters are also capacitively switched, this may lead to a small number of vacuum leadthroughs in an absolute sense, particularly smaller than 10, for example 3.

An important aspect of the proposed picture display device is its good picture uniformity which can be realised. This is caused by the fact that the electron generation in and the electron transport through the compartments is limited due to field distortion saturation and/or space charge saturation. If necessary, the electron currents at the end of the compartments can be measured (in successive picture blanking periods). In the case of mutual inequality a feedback to the video signal or a current control (control of the amplitude) of the emitter currents is possible so as to obtain the desired uniformity.

A further important aspect is that it is not necessary to use a complicated electron-optical system or a magnetic field shielding.

Neither is there any problem of the ion feedback which generally occurs when using channel plate electron multipliers. This is caused by the fact that the positive ions are drawn out by the field keeping the electrons inside the compartment before they can generate unwanted electrons.

An important aspect of the invention is that the electron ducts (may)serve as a vacuum support so that the front and rear walls of the picture display device according to the invention may be relatively thin as compared with those of known picture display devices of the thin type (total thickness, for example <10 mm). In this connection an embodiment is characterized in that a plurality of parallel partitions of electrically insulating material is provided for laterally localising the produced electrons, which partitions also serve as a vacuum support.

In this connection a further embodiment is characterized in that the picture display device is provided with a central plate of electrically insulating material, while one main surface has a plurality of first grooves separated by walls constituting said partitions, and the other main surface has a plurality of second grooves extending transversely to the first grooves. The first and second grooves may intersect one another, with the apertures for withdrawing the electrons being formed at the points of intersection. Alternatively, the first and second grooves may cross one another at opposite sides of the plate, the plate being pierced at the crossings of the first and second grooves for forming said apertures.

In this connection further advantageous aspects are characterized in that the cavities may be formed in a substrate, which substrate may also form part of the vacuum envelope.

BRIEF DESCRIPTION OF THE DRAWINGS

Some embodiments of the invention will now be described in greater detail with reference to the accompanying drawing figures in which.

DESCRIPTION OF THE PREFERRED EMBODIMENT

Figure 1:
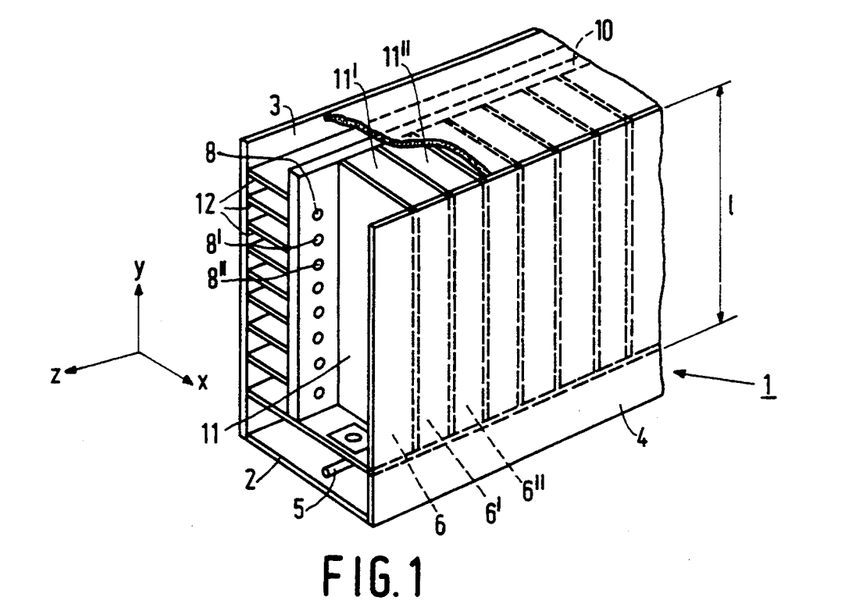
FIG. 1 is a diagrammatic perspective elevational view, partly broken away, of a part of a construction of a picture display device according to the invention whose components are not drawn to scale.

FIG. 1 shows a picture display device 1 of the thin type having a panel (window) 3 and a rear wall 4 located opposite said panel. A cathode arrangement 5, for example a line cathode which by means of electrodes provides a number of cathodes, for example 600, or a similar number of separate electrodes, is present proximate to a wall 2 which connects panel 3 to rear wall 4. Each of these cathodes is to provide, for example a current of only a few nanoamperes (dependent on the amplification) so that many types of cathodes (cold or thermal cathodes) are suitable. The cathodes may be arranged jointly or separately. They may have a constant or controllable emission.

Figure 2A:
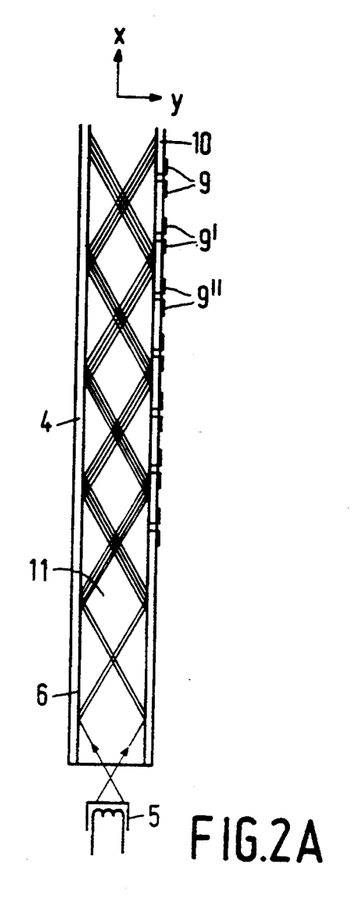
FIGS. 2A and 2B show diagrammatically and in a cross-section two types of electron ducts to be used in the construction of FIG. 1.
Figure 2B:
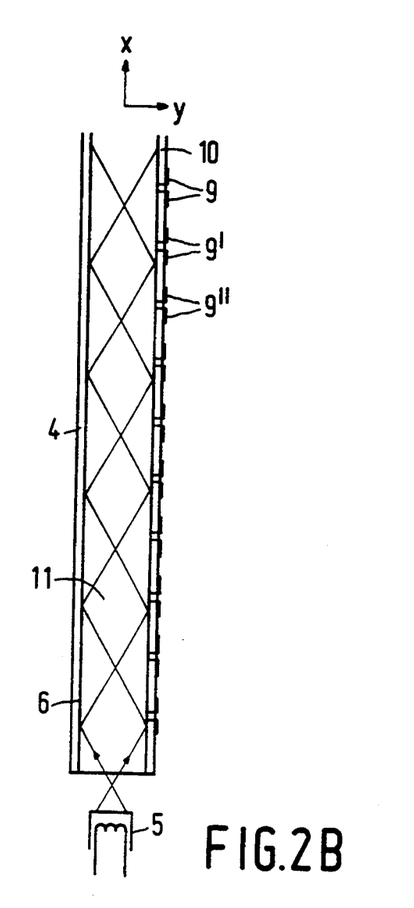

With reference to FIGS. 2A and 2B, two embodiments of the principle on which the invention is based will be successively described:

a) electron transport with amplification in a compartment;

b) electron transport without amplification in a compartment.

Figure 1A:
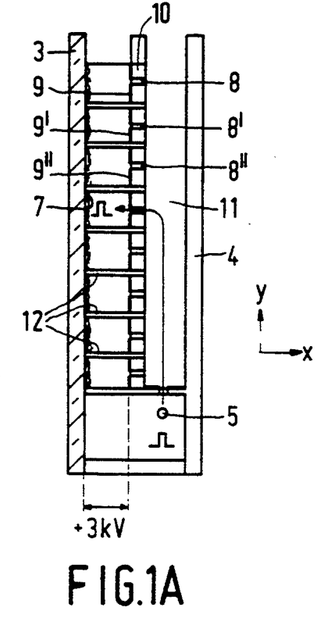
FIG. 1A is a side elevation of the construction of FIG. 1.
Figure 1B:
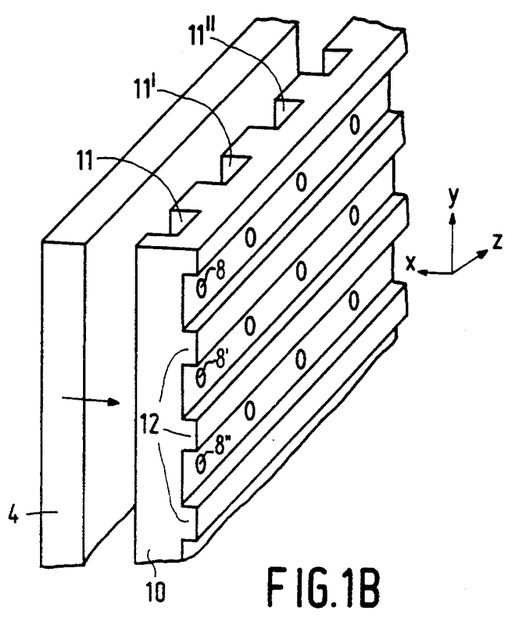
FIG. 1B shows diagrammatically and in a cross-section a possible modular structure of a picture display device according to the invention.

In embodiment a. a row of electron ducts constituted by compartments 6, 6', 6", . . . etc., in this case one compartment per cathode, is arranged above the cathode arrangement 5. These compartments have walls surrounding cavities 11, 11', 11", which walls are made of a material having a suitable electrical resistance for the object of the invention (for example, ceramic material, glass, synthetic material, coated or uncoated) and which have a secondary emission coefficient $\delta > 1$ over a given range of primary electron energies. The electrical resistance of the wall material should be so large that a minimum possible amount of current (preferably less than, for example 10 mA) will flow in the walls in the case of a potential difference of the order of one hundred to several hundred Volts per cm, required for the electron transport. The "front" walls of the compartments may be constituted by a joint central plate 10. The "rear" walls of the compartments may be constituted by the rear wall 4 of the picture display device. The rear wall may be, for example a substrate having a surface in which a number of parallel vertical cavities is formed and the central plate 10 may be a flat plate. Alternatively, the central plate 10 may be a (for example, preformed) plate, as is shown in FIG. 1B, in which crossing channels are provided at both sides, and the rear wall 4 may be a flat plate.

A voltage of the order of several hundred Volts per cm (for example, 200 V/cm) is applied in the longitudinal direction 1 across all compartments combined in order to produce the required axial electric field. By applying a voltage of the order of 100 V (the voltage value is dependent on the circumstances) between the cathode row 5 and the compartments 6, 6', 6", electrons are accelerated from the cathodes to the compartments, whereafter they impinge upon the walls in the compartments and generate secondary electrons. In their turn, the generated secondary electrons are accelerated and generate new electrons. This is continued until saturation. (This saturation may be space charge saturation and/or it may be produced by field distortion). A constant vacuum current will flow from the saturation point through the relevant compartment (FIG. 2A).

In the above-mentioned example of embodiment a. the circumstances are such that electron transport as well as electron multiplication occurs in the compartments, for example, because the compartment walls have undergone a given treatment so as to give them an elevated secondary emission, or because separate thin layers having a high secondary emission are provided on the compartment walls. However, it appears to be surprisingly possible to choose the circumstances in such a way that only electron transport occurs (Embodiment b.). This has, inter alia, the advantage that the potential difference to be applied across the compartments can be considerably smaller, which is very important for the electric drive of the picture display device. As a result the power consumption will also be considerably smaller, which is even enhanced by the fact that a minimal current flows in the walls. Moreover, the operation is not dependent on saturation effects in this case. In a close approximation the current is constant throughout the compartment length: the current entering the compartment is the same as that leaving the compartment (FIG. 2B).

Embodiment b. is based on the recognition that vacuum electron transport within compartments having walls of electrically insulating material is possible if an electric field of sufficient power is applied in the longitudinal direction of the compartment. Such a field realises a given energy distribution and spatial distribution of electrons injected into the compartment so that the effective secondary emission coefficient $\delta_{eff}$ of the walls of the compartment will be equal to 1 on average in operation. Under these circumstances one electron will leave for each electron which enters (on average), in other words, the electron current is constant throughout the compartment and is approximately equal to the current which enters. If the wall material is high-ohmic enough (which is the case for all appropriate untreated glass types as well as for electrically insulating materials such as Kapton polyimide materials, Pertinax plastic-impregnated paper materials, and ceramic materials), the walls of the compartment cannot produce or take up any net current so that this current, even in a close approximation, is equal to the entering current. If the electric field is made larger than the minimum value which is required to obtain $\delta_{eff}=1$, the following will happen. As soon as $\delta_{eff}$ is slightly larger than 1, the wall is charged inhomogeneously positively (due to the very small conductance this charge cannot be depleted). As a result, the electrons will reach the wall earlier on average than in the absence of this positive charge, in other words, the average energy taken up from the electric field in the longitudinal direction will be smaller so that a state with $\delta_{eff}=1$ adjusts itself. This is a favourable aspect because the exact value of the field is not important, provided that it is larger than the previously mentioned minimum value.

There is another advantage. The example of embodiment a. uses electron multiplication ($\delta_{eff}>1$). The value of $\delta$ may, however, vary across the length of the compartment and from compartment to compartment. A uniform picture on the luminescent screen can only be obtained if the space charge limitation of the current intensities is sufficiently constant and reproducible. In the embodiment without amplification ($\delta_{eff}\approx 1$) the electron current in the compartment is constant and can be made to be very satisfactorily equal via measuring and feedback or via current control for each compartment, so that uniformity is ensured.

Figure 1C:
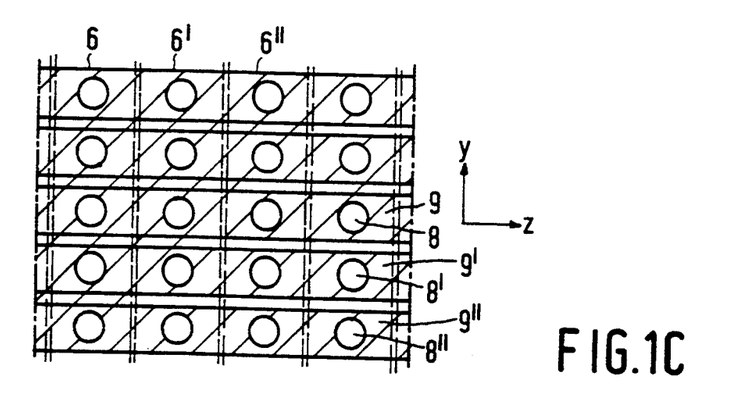
FIG. 1C shows a part of a (selection) electrode arrangement to be used in the construction of FIG. 1.
Figure 1D:
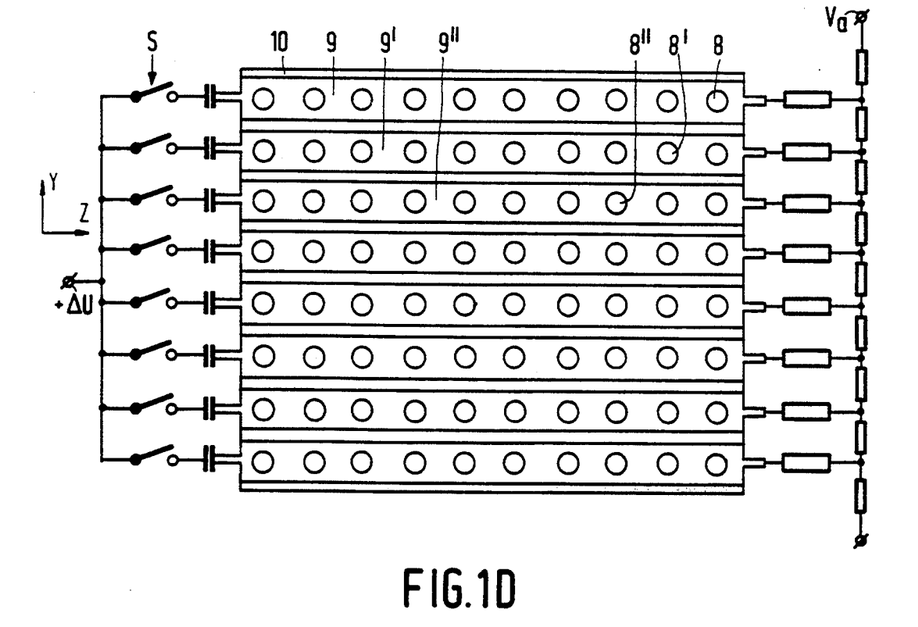
FIG. 1D shows a switching circuit for driving a (selection) electrode arrangement.
Figure 1E:
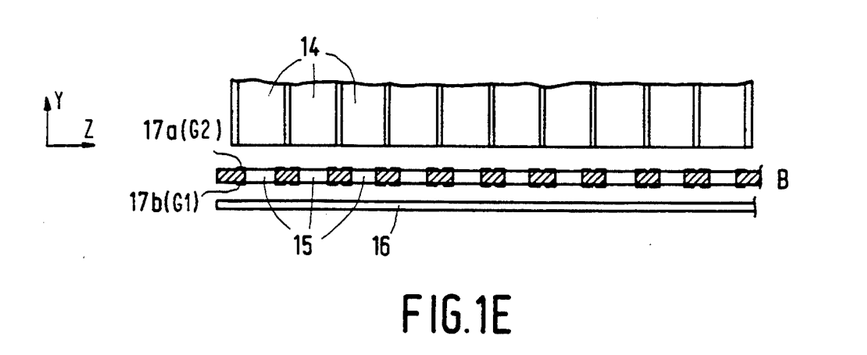
FIG. 1E shows a drivable line arrangement of electron emitters.

The central plate 10 of the compartment walls facing the luminescent screen 7, which is arranged on the inner wall of the panel 3, (see FIG. 1A), accommodate apertures 8, 8', 8" etc. A gating structure may be present in order to "draw" a flow of electrons from a desired aperture when using cathodes which are not separately driven. However, individually driven electron emitters are preferably used in combination with apertured selection electrodes 9, 9', 9", . . . to be energised by a selection voltage, which are present between the compartments and the screen 7. FIG. 1E shows how electron emitters which can be individually driven by means of electrodes 17a, 17b are realised by means of a line cathode 16 and an electrically insulating plate B which has apertures 15. The electrons produced thereby are drawn into the compartments 14. The selection electrodes 9, 9', 9"; . . . are implemented for each picture line, for example in the way shown in FIG. 1C (electrodes with apertures coaxial with the apertures 8, 8', 8", . . . ). The apertures in the electrodes will generally be as large as the apertures 8, 8', 8", . . . If they are larger, aligning will be easier. Desired locations on the screen 7 can be addressed by means of matrix drive of the individual electron emitters and the selection electrodes 9, 9', 9", . . . . Voltages which increase substantially linearly (as viewed from the cathode side) are applied to the selection electrodes 9, 9', 9", . . . (FIG. 1D). The swiches S are open in the off-state. When a picture line must be activated, i.e. when electrons must be withdrawn via apertures in an aperture row from the columnwise arranged electron currents flowing behind them, a pulsatory voltage AU is added to the local voltage by closing the switch which is electrically connected to the relevant line. In view of the fact that the electrons in the compartments have a relatively low velocity due to the collisions with the walls, ΔU may be comparatively low (of the order of 100 V). In this case a voltage difference $V_a$ is taken across the total compartment height, which is just too small to draw electrons from apertures. This does happen by applying a positive line selection pulse of the correct value.

Figure 3:
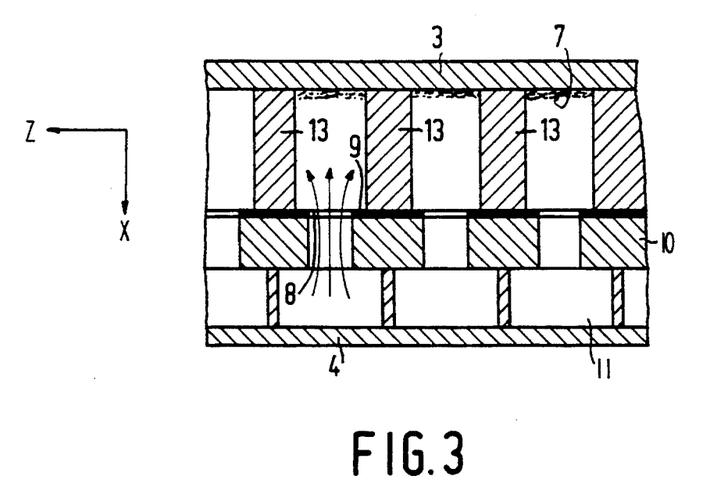
FIG. 3 is a "horizontal" cross-section through a part of a construction of the type of FIG. 1.

FIG. 3, which is a "horizontal" cross-section through a part of the construction shown in FIG. 1, shows by way of arrows that electrons which are drawn by selection electrode 9 from an electron duct cavity 11 surrounded by compartment walls via an aperture 8 are accelerated towards the luminescent screen 7 where one picture line at a time can thus be scanned. The video information may be applied, for example in the form of pulse width modulation. For example, a cathode cooperating with an electron duct can be activated for a shorter or longer time. For producing a white pixel the cathode may be activated during the entire line period in this case. An alternative is to activate the cathode constantly during the entire line period, while controlling the emission level. The electron current withdrawn through aperture 8 may be trapped between "horizontal" walls 12 (FIG. 1) and/or between "vertical" walls 13 (FIG. 3) which simultaneously ensure the desired vacuum support. An alternative is the use of a spacer plate filling the space between the screen 7 and the central plate 10 (and denoted by reference numeral 13 in FIG. 3) which has apertures which are coaxial with and larger than the apertures 8, 8', 8'', . . . and which are preferably rotationally symmetrical. Due to the total vacuum support the front and rear walls may be thin ($\leq 1$ mm) and the picture display device itself may thus have a light weight. The outer dimension transverse to the screen (the depth) of the picture display device may also be very small. Even for screen sizes of $\sim 1$ m$^2$ a depth of, for example 1 cm is possible.

Further advantages are:
there need not be any colour purity problems;
there need not be any problems caused by back-scattering from the luminescent screen;
the electron transport already works at a relatively poor vacuum (below approximately $10^{-3}$ Torr), so the cathodes determine the vacuum requirement;
no complicated electron-optical system required;
no stringent mechanical tolerance requirements.

Figure 10:
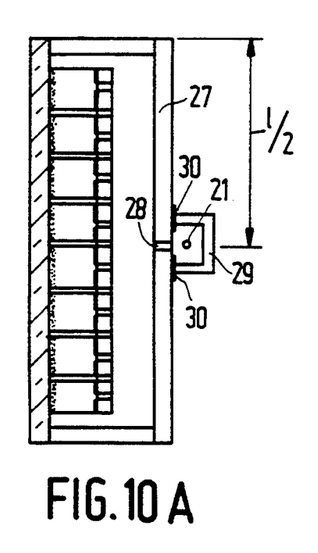
FIGS. 10A, 10B and 10C are elevational views of a cross-section through a picture display device according to the invention with an alternative cathode arrangement and the voltage differences to be applied.

The electric voltage across the compartments, required for electron guidance in the compartment cavities, increases as the length of the compartments increases. However, by arranging a line arrangement of emitters 21 centrally in the display, as shown in FIG. 10A, device instead of on its "bottom" (as in FIG. 1), this voltage can be reduced. A voltage difference of, for example 3 kV may then firstly be applied between the centre of the compartments and their upper ends so as to "draw up" the electron current and subsequently the same voltage difference can be applied between the centre and the bottom so as to "draw down" the electron current, instead of a voltage difference of 6 kV throughout the height if the emitters are arranged on the "bottom" of the display device.

FIG. 3 is a horizontal cross-section through a construction of the type shown in FIG. 1, through a row of apertures 8 . . . in the central plate 10.

When selecting a (video) line, a positive voltage pulse is applied to the relevant selection electrode (9). To ensure that produced electrons leave the compartment cavities exclusively via the apertures in the relevant selection electrode, this pulse must have a relatively large amplitude of the order of 300 V, which can be realised but leads to an expensive circuit. The exact value of this amplitude also depends on the extent of punch-through of the high voltage through the apertures between the screen 7 and the electrodes 9, . . . .

Figure 4:
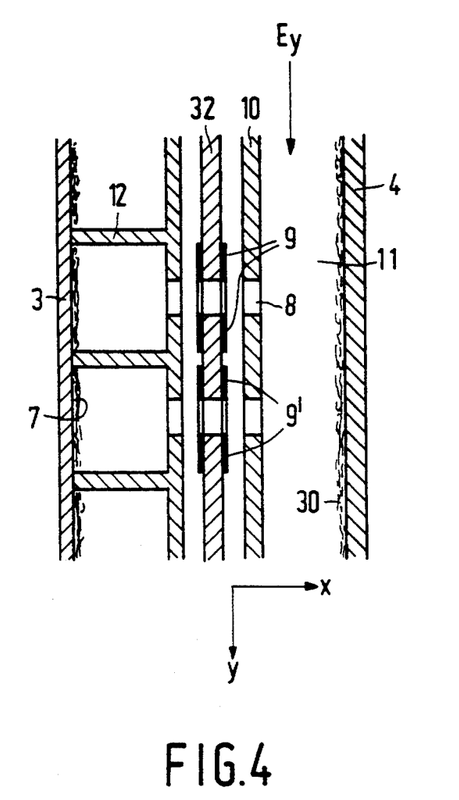
FIGS. 4, 5, 6 and 7 show "vertical" cross-sections through electron ducts of constructions comparable to the construction of FIG. 1.

The above-mentioned problem arises when the transport of the electrons is insufficiently separated from the line selection. The separation can be improved by providing a high-ohmic resistance layer (denoted by reference numeral 30 in FIGS. 4 and 7) on the rear wall 4 or on the side walls of the compartment cavities (11) in which the (vertical) transport of electrons takes place. The voltage drop across this layer provides the electric field $E_y$ required for transport. If the voltage at a selection electrode is made, for example 50 V lower than the local resistance layer potential, the electrons will not leave the channels at the location of this selection electrode but will be further transported. A positive pulse of, for example 100 V (again dependent on the punch-through) is then sufficient to select a picture line. Instead of a resistance layer 30, discrete electrically conducting strips may be used. For a resistance layer a resistance of approximately $10^8$ to $10^{12}$ Q across the height of the layer is to be considered. To achieve this, a meandering pattern may be recessed in the layer. To ensure that only electrons are withdrawn from a desired aperture, it is advantageous to give the electrodes 9, 9', . . . as shown in FIG. 4 a double construction, for example by providing electrically conducting tracks or strips on both sides of a kapton foil 32.

Figure 5:
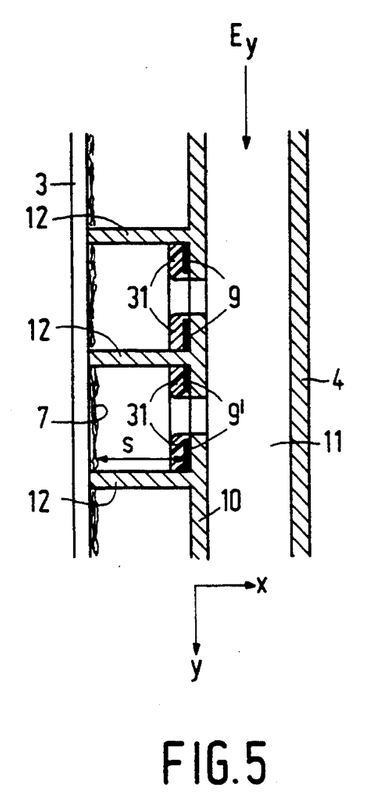

The distance S between selection electrodes 9, . . . and luminescent screen 7 is, for example 2 mm (see FIG. 5). In the absence of electron beams this is sufficient to be able to supply an acceleration voltage of, for example 3 kV. However, in full operation the walls 12 keeping the compartment cavities 11 spaced apart from the screen are positively charged so that this voltage is much closer to that for the electrodes. This sometimes gives rise to field emission from the electrodes 9, 9', . . . to the screen 7, which may cause unwanted luminescence.

This problem can be solved, for example, as follows:
a. burying the selection electrodes 9, . . . in electrically insulating material 31, see FIG. 5,
b. screening the walls 12 from secondary electrons by means of electrodes 33 which are cylindrical in the case shown and which are coaxial with the extraction apertures 8, which electrodes carry the potential of the selection electrodes 9, . . . see FIG. 6. An additional advantage is the positive lens action of the assembly. For a satisfactory operation it is important that the electrodes 33 are free from the walls 12 over a substantial part of their surface so that they are "shadowed". Instead of self-supporting metal electrodes 33, hollow synthetic material components with metal layers which are vapour-deposited on their inner sides may be used alternatively.

Figure 6:
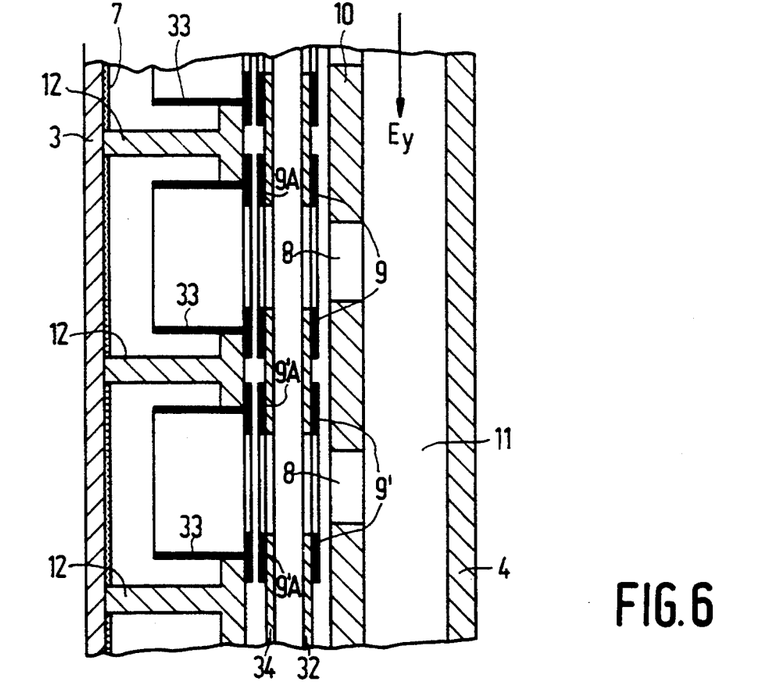
Figure 7:
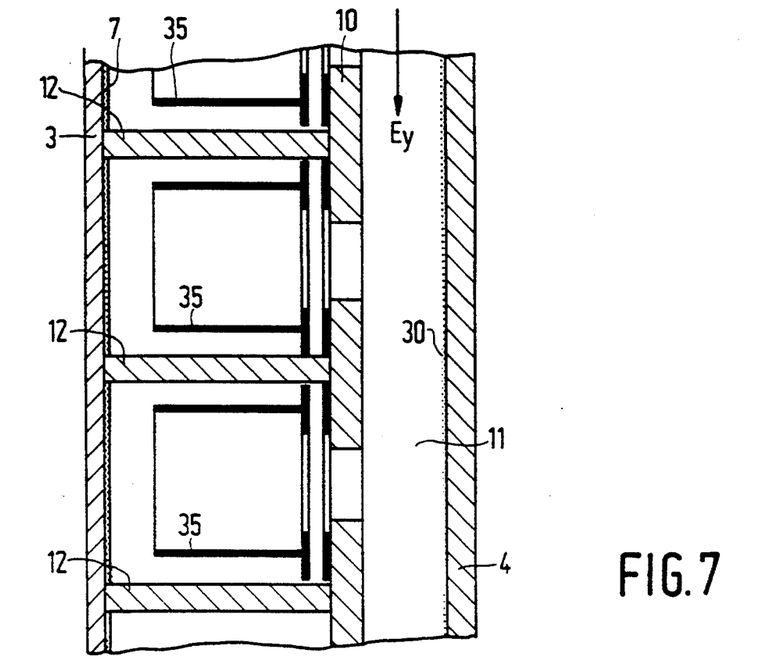

FIG. 6 is a vertical cross-section through a construction of the type shown in FIG. 1, through a compartment cavity 11. Compartment cavity 11 is bounded by a rear wall 4 and a central plate 10 having apertures 8. Particularly if the central plate 10 has the structure, shown in FIG. 1B with crossing channels on both sides, it may be made of synthetic material (for example, teflon); a first foil 32 of, for example, Kapton polymide material, which is 50 $\mu$m to 100 $\mu$m thick, with conducting tracks 9, 9', . . . is provided at the outer side, at the side of the central plate 10, and a second foil 34 of the same material, which is 50 $\mu$m to 100 $\mu$m thick, with conducting tracks 9A and 9'A, . . . is provided at the side remote from the central plate 10. Cylindrical auxiliary electrodes 33, 33' . . . of, for example CuNi, thickness cylinder wall 0.1 mm, bottom thickness, for example 0.05 mm, with apertures 1.0 $\phi$ or 1.2 $\phi$ (no bottom at 1.2 $\phi$) are arranged between spacer walls 12. The auxiliary electrodes 33 may be formed, for example from pierced metal strips, with bushes being provided around the bores, for example, by way of electro-deposition. The auxiliary electrodes 33 may also be used for selecting (picture) lines by giving them the right voltage. The selection electrodes 9, 9', . . . and 9A, 9'A, . . . may then be omitted. When double selection electrodes are used, the electrodes facing the screen may alternatively be combined with the cylindrical auxiliary electrodes, as is shown in FIG. 7. For selecting a line, a positive selection pulse may be applied, for example to the "bushes" 35 of a row, while a counter voltage (for example 200 V) is applied to the bushes of an adjoining, previous row. This prevents electrons from being drawn from non-selected apertures and accelerated towards the screen.

In the afore-described constructions the electrons are transported in compartments with walls made of electrically insulating material (with a suitable secondary emission coefficient) provided with (small) apertures at the screen side. Except in cases where a high-ohmic resistance layer is provided, electrodes are present directly at the outer side of these apertures and ensure the transport of the electrons and also the selection of the active video line. To improve the contrast, the selection electrodes may have a double construction. This results in a relatively complicated mechanical construction. Moreover, a number of electrons may acquire large velocities during transport, which may cause, for example loss of contrast in these constructions.

The last-mentioned problem may be solved by placing geometrical obstacles in the compartments, which obstacles prevent electrons from being accelerated straight through to large velocities.

As described hereinbefore, lateral localisation of the electron currents can be achieved by arranging vertical partitions between the compartment cavities, which partitions also serve as a vacuum support, but lateral localisation may alternatively be achieved via electrical means, for example by applying suitable potentials to vertical electrically conducting tracks on the rear wall.

The following method of providing the afore-mentioned high-ohmic resistance layer may be used: A glass plate is coated with a homogeneous powder layer comprising glass enamel particles and $RuO_2$ particles or similar particles. This powder layer may be given a meandering configuration, for example by means of scratching, silk screening or photolithography; subsequently the glass plate with the powder layer is heated until the resistance layer has reached the desired resistance value. Such a resistance layer may also be used as a voltage divider to which the selection electrodes are connected.

Figure 14:
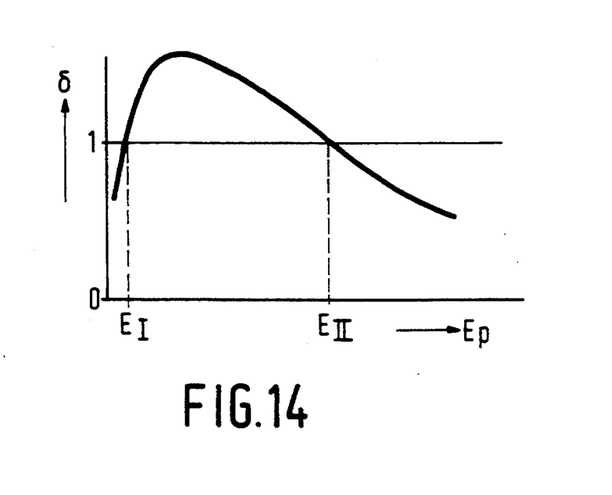
FIG. 14 is a graph in which the secondary emission coefficient $\delta$ as a function of the primary electron energy $E_p$ is plotted for a wall material suitable for the device according to the invention.

The materials to be used for the walls of the electron ducts must have a high electrical resistance and a secondary emission coefficient $\delta > 1$, see FIG. 14, at least over a certain range $E_I$–$E_{II}$ of primary electron energies $E_p$. $E_I$ is preferably as low as possible, for example one or several times 10 eV. Inter alia, glass ($E_I$ is approximately 30 eV), ceramic material, Pertinax plastic-impregnated paper materials, and Kapton polymide materials meet this requirement.

The electrical resistance depends on whether not only electron guidance but also amplification (over a part or over the total length) of the electron ducts is desired and how much total current may flow in the walls in connection with the power to be dissipated.

The mode using electron guidance only is of course preferred. The electrical resistance may then be in the range between $10^6$ and $10^{15}$ ohms. As an alternative, at least the cathode-sided portion of the electron ducts may have a relatively low resistance, for example in the range between 10 K$\Omega$ and 100 M$\Omega$ so as to ensure amplification. At the above-mentioned values the required powers are not higher than 100 W.

In a given case electron transport was realised in a compartment of lead glass with a length of 17 cm and a bore of 1 mm diameter (electrical resistance $> 10^{15}\Omega$) by applying an electric voltage of 3.5 kV across the ends.

It is further to be noted that the walls may consist of an electrically insulating material which has a constructive function as well as a secondary emission function. Alternatively, they may consist of an electrically insulating material having a constructive function (for example, a synthetic material), on which material a layer having a secondary emission function is provided (for example, quartz or glass or ceramic material such as MgO).

Colour selection can be realised in different ways, for example, by using a luminescent screen with vertical triplets of red, green and blue phosphor lines and by using three times as many electron emitters and electron ducts as in the case of a monochrome display, in combination with horizontal scanning.

Figure 8:
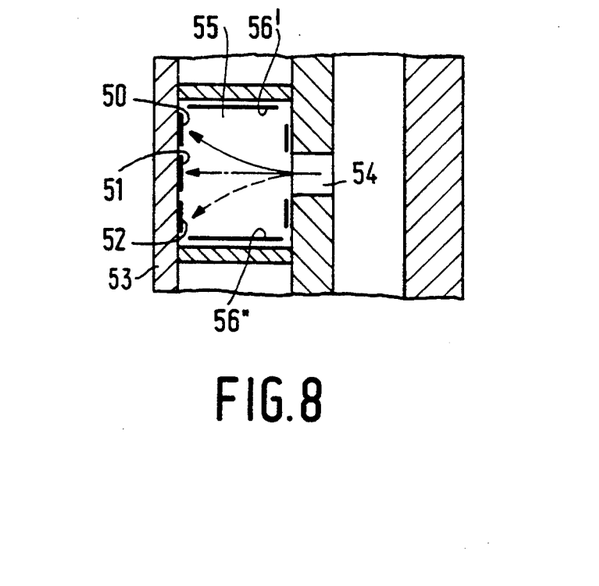
FIG. 8 is a "vertical" cross-section through a part of a construction of the type of FIG. 1 suitable for displaying colour pictures.
Figure 15:
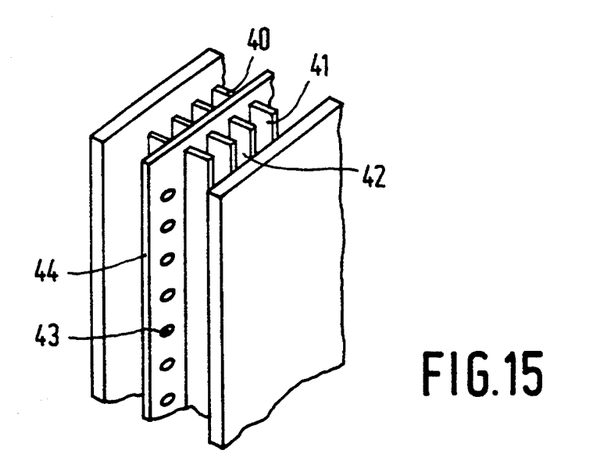
FIG. 15 shows an alternative for the FIG. 1 construction.
Figure 16:
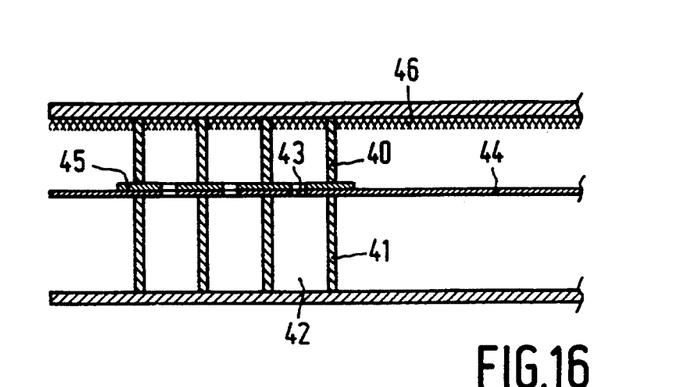
FIG. 16 is a "horizontal" cross-section through a part of the construction of FIG. 15.
Figure 17:
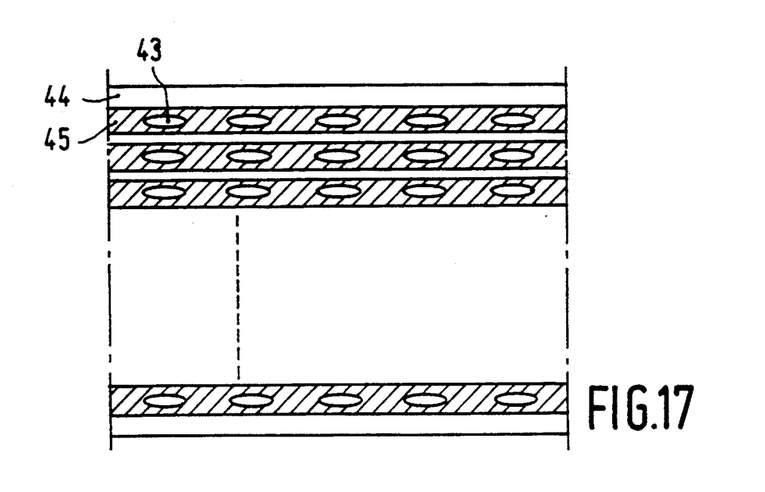
FIG. 17 represents a front view of the member 44 of the FIG. 15 construction.

The foregoing examples however, are based on the use of a luminescent screen 7 (FIG. 1A) having a plurality of horizontal areas of luminescent material separated, for example by partitions 12. (In the case of a monochrome picture display device all these areas luminesce in the same colour). In the case of a colour picture display device it is practical to divide each one of the afore-mentioned areas into three sub-areas luminescing in red, green and blue, respectively. To drive the sub-areas, the picture display device may be constructed in such a manner that each sub-area cooperates with a row of extraction apertures. This means that the number of extraction apertures in the vertical direction is three times as large as in the case of a monochrome picture display device, the number of electron emitters and electron ducts however being the same. As in this case the colour selection electrodes are very narrowly spaced, it is difficult to position the "horizontal" walls 12 (FIG. 1) which provide the vacuum support for the luminescing screen 3. In this situation it is advantageous to arrange "vertical" support walls 40, which extend parallel to the side walls 41 of the transport compartments 42, as is schematically shown in FIG. 15. FIG. 16 shows a cross-section through a row of apertures 43 in intermediate plate 44 of the FIG. 15 construction. In FIG. 16 also one representative 45 of an arrangement of apertured electrically conductive strips can be seen. FIG. 17 shows a front view of intermediate plate 44 which is provided with such an arrangement of electrically conductive strips 45. Each strip functions as a selection electrode for a colour line. The positions of the spots on the luminescent screen 46 (FIG. 16) are determined by the apertures 43 in the intermediate plate 44. Plate 44 actually is the only part of the FIG. 15 display tube construction which has to be made with high accuracy. It is noted that the invention is not restricted to the use of luminescing screens of the type having colour triplets of parallel lines. Other triplet configurations (e.g. delta configurations) may be used as well. The strips 45 may be provided e.g. by means of vacuum deposition. In FIG. 17 the strips 45 have non-circular, in this case substantially elliptical, apertures which are in-line with the apertures 43 in the central plate 44 which have the same shape. Non-circular apertures 43 may be preferred over circular apertures 8, 8" ... (FIG. 1) in case it is necessary to increase the number of electrons withdrawn from the transport compartments (42). An alternative is illustrated with reference to FIG. 8. The construction shown in this Figure is realised in such a way that each time a triplet of red, green and blue luminescing sub-areas 50, 51, 52, which are provided on the inner wall of a glass panel 53, cooperates with one extraction aperture 54. In the space 55 in which an electron current drawn from aperture 54 is accelerated towards the luminescent sub-areas 50, 51, 52, (for example, plate-shaped) electrodes 56 and 56' extending parallel to the areas 50, 51 and 52 are arranged on both sides of the aperture 54. These (horizontal) electrodes may have, for example all apertures of a row in common. By energising the electrodes 56 and 56' separately, an electron current can be influenced so that it impinges either on sub-area 50, or on sub-area 51, or on sub-area 52. In this case the picture display device can be operated in such a way that three separate scans are performed for each picture line, each at a 3 times higher frequency than the normal scanning frequency, while maintaining the standard field frequency.

Figure 9:
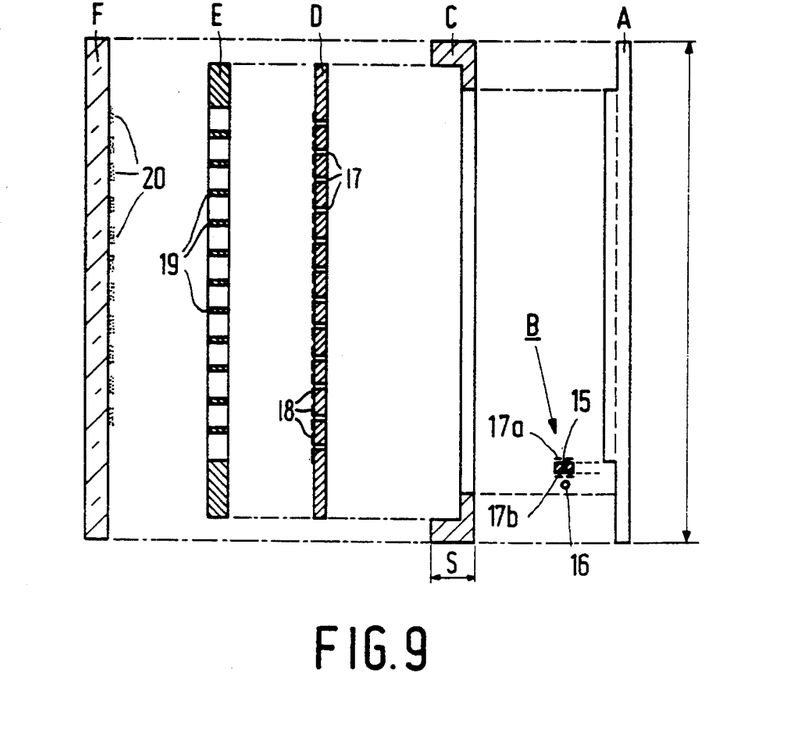
FIG. 9 shows diagrammatically and in a cross-section a possible modular structure of a picture display device according to the invention.

FIG. 9 shows a possible modular structure of a picture display device according to the invention:

A: Rear wall of electrically insulating material (for example glass) having a thickness of 2 mm. This rear wall has a large number of cavities 14 having a square cross-section and a rib of, for example 1 mm (the deeper the cavities, the higher the voltage which will be required to operate the device) and a pitch S of, for example 1 mm.

B: Cathode drive (control) plate of electrically insulating, for example ceramic material with a thickness of, for example 1 mm. This plate has a number of apertures 15 corresponding to the number of cavities 14. A cathode wire 16 is present under the cathode drive plate. Emitters which can be separately modulated can be realised by means of electrodes 17a, 17b of, for example vapour-deposited aluminium proximate to the apertures 15 for emitting electrons in the cavities 14 (FIG. 5). All electrodes 17a may be interconnected and the electrodes 17b may be separately driven, or vice versa. Alternatively, separate emitters, for example field emitters can be used.

C: Spacers, size s for example 3 mm.

D: Drive plate of electrically insulating material, for example glass, thickness, for example 0.75 mm. The drive plate will be positioned on the rear wall A and has a column arrangement of apertures 17, the columns corresponding to the cavities 14. Drive electrodes 18 are provided (for example in a manner as shown in FIG. 1C with respect to the selection electrodes 9, 9', 9'' proximate to the apertures 17 on the side of the drive plate D remote from the rear wall A.

E: Lattice having a width of 2 mm and having bars 19 between the apertures 17 in the drive plate D, or a spacer plate having coaxial apertures.

F: Window of glass (panel) having a thickness of, for example 1 or 2 mm. The inner side of the window has a pattern of horizontal phosphor lines 20.

For a structure as described above the depth of the picture display device is approximately 8 mm. Thus, we may really speak of a "picture on the wall". The components A, C and D may constitute one integral module made of, for example ceramic material, for example in combination with a (glass) rear wall.

The electric voltage across the compartments required for electron guidance in the compartment cavities increases as the length of the compartments increases. However, by arranging a line arrangement of emitters 21 centrally in the display device (as in FIG. 10A) instead of on the bottom (as in FIG. 1) this voltage can be reduced. A voltage difference of, for example 3 kV may then firstly be applied between the centre of the compartments and their upper ends so as to "draw up" the electron current (FIG. 10B) and subsequently the same voltage difference can be applied between the centre and the bottom so as to "draw down" the electron current (FIG. 10C). In the case of FIG. 1 a voltage difference of 6 kV would have been required. A still further reduction of the required voltage difference is possible by forming the line arrangement of emitters from more than one row, for example two rows 22, 23 arranged at ¼ of the compartment length from the top and the bottom (FIG. 11) which reduces the required voltage difference to ¼. The required voltage difference is reduced to 1/6 by taking three rows of emitters 24, 25, 26 and arranging them in the way shown in FIG. 12.

Figure 11:
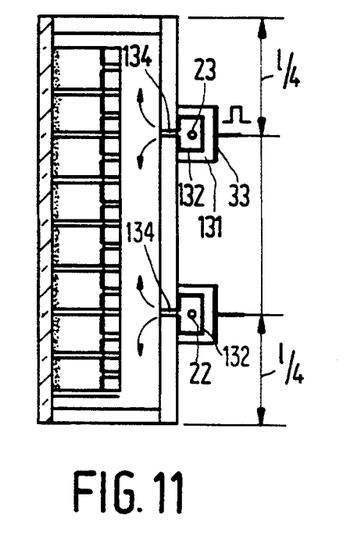
FIGS. 11 and 12 are cross-sections of picture display devices with further cathode arrangements.
Figure 12:
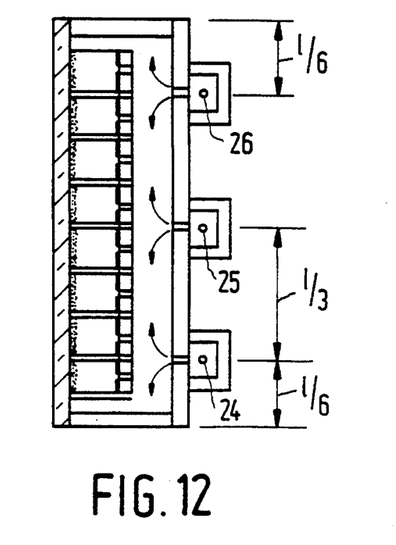
Figure 13:
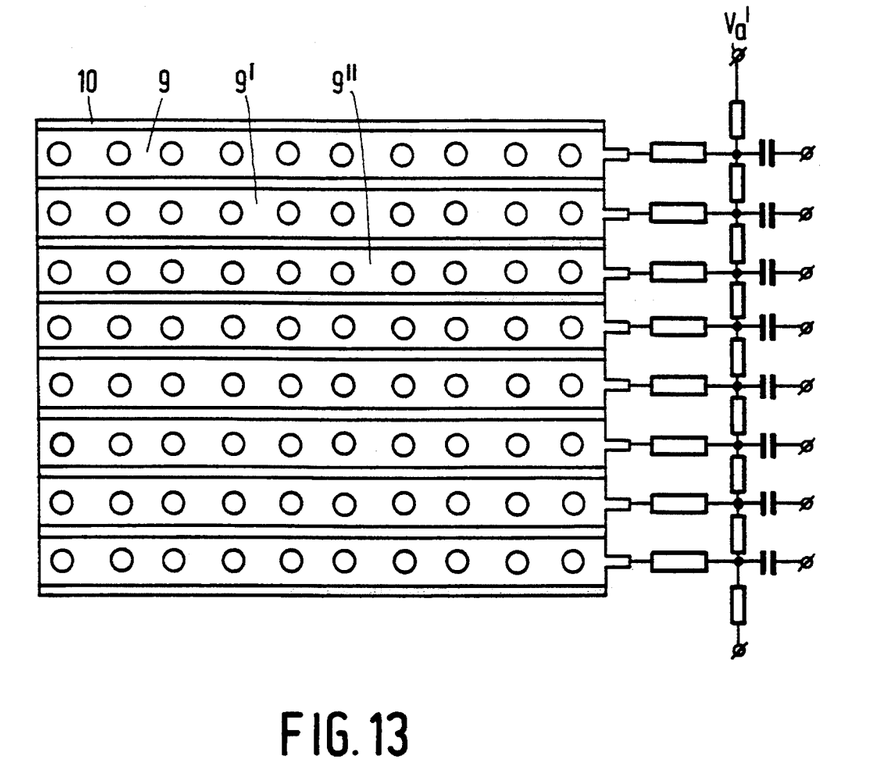
FIG. 13 shows an alternative to the electrode switching circuit of FIG. 1D.

In FIG. 10A a wall 27 having apertures 28 functions as a cathode drive (control) plate. By means of electrodes 30 arranged proximate to each aperture 28, the cathode wire 21 arranged in a space 29 of electrically insulating material provides for emitters which can be separately modulated. The electrodes 30, which fulfil the function of one of the electrode configurations 17a, 17b of FIG. 1E, can be connected from the exterior. The other electrode configuration is not shown. It may be present (and then constitute a series arrangement) or it may be absent, provided that the drive possibilities, which are poor in that case, are no objection. An even more advantageous embodiment is shown in FIG. 11. By means of electrodes 32 which can be capacitively driven and extend on the inner wall of the space as far as proximate to each aperture 34, the cathode wire 23 enclosed in space 31 provides for emitters which can be separately modulated. The electrodes 32 are capacitively driven by means of electrodes 33 arranged on the outer side of the space 31. Cathode wire 22 is equipped in a similar way. The description of FIG. 10A also applies to the electrodes.

An alternative to the switching circuit of FIG. 1D is to work exclusively with positive line selection pulses (of, for example 200 V or less). In that case a voltage difference $V_a'$ is taken across the height of the compartments 6, 6', 6'' (FIG. 1), which height is just too small to draw current (from an aperture). This does happen by applying a positive line selection pulse of the correct value (FIG. 14).

We claim:

1. A display device comprising an envelope including a surface bearing a luminescent screen having a multiplicity of predefined areas and electron source means for selectively energizing respective ones of said areas to produce an image, characterized in that said display device comprises:

a. at least one electron current transport duct defined by at least one wall comprising a material having a predetermined secondary emission coefficient;

b. first electrode means arranged for producing a predetermined electric field within the at least one duct;

c. electron producing means arranged for providing electrons in the at least one duct;

said predetermined secondary emission coefficient and the arrangement of said first electrode means being chosen to effect an electron current in an operative length of the at least one duct;

d. wall means having apertures disposed in communication with said predefined screen areas and the at least one duct;
e. second electrode means for selectively effecting extraction of electron currents from the at least one duct for propagation through said apertures; and
f. means for effecting transport of the extracted electron currents toward said screen.

2. A display device comprising an envelope including a surface bearing a luminescent screen having a multiplicity of predefined areas and electron source means for selectively energizing respective ones of said areas to produce an image, characterized in that said display device comprises:
   a. at least one electron current transport duct defined by at least one wall comprising a material having a predetermined secondary emission coefficient;
   b. first electrode means arranged for producing a predetermined electric field within the at least one duct;
   c. electron producing means arranged for providing electrons in the at least one duct;
   said predetermined secondary emission coefficient and the arrangement of said first electrode means being chosen to effect an electron current in an operative length of the at least one duct;
   d. wall means having apertures disposed in communication with said predefined screen areas and the at least one duct;
   e. second electrode means for selectively effecting extraction of electron currents from the at least one duct for propagation through said apertures; and
   f. means for directing the extracted electron currents toward the luminescent screen.

3. A display device comprising an envelope including a surface bearing a luminescent screen having a multiplicity of predefined areas and electron source means for selectively energizing respective ones of said areas to produce an image, characterized in that said display device comprises:
   a. at least one electron current transport duct defined by at least one wall comprising a material having a predetermined secondary emission coefficient;
   b. first electrode means arranged for producing a predetermined electric field within the at least one duct;
   c. electron producing means arranged for providing electrons in the at least one duct;
   said predetermined secondary emission coefficient and the arrangement of said first electrode means being chosen to effect an electron current in an operative length of the at least one duct;
   d. wall means having apertures disposed opposite corresponding ones of said predefined screen areas and being in communication with the at least one duct;
   e. second electrode means for selectively effecting extraction of electron currents from the at least one duct for propagation through said apertures; and
   f. means for directing the extracted electron currents toward the corresponding ones of said predefined screen areas.

4. A display device comprising an envelope including a surface bearing a luminescent screen having a multiplicity of predefined areas and electron source means for selectively energizing respective ones of said areas to produce an image, characterized in that said display device comprises:
   a. at least one electron current transport duct defined by at least one wall comprising a material having a predetermined secondary emission coefficient;
   b. first electrode means arranged for producing a predetermined electric field within the at least one duct;
   c. electron producing means arranged for providing electrons in the at least one duct;
   said predetermined secondary emission coefficient and the arrangement of said first electrode means being chosen to effect an electron current in an operative length of the at least one duct;
   d. wall means having apertures disposed in communication with said predefined screen areas and the at least one duct;
   e. second electrode means for selectively effecting extraction of electron currents from the at least one duct, said second electrode means comprising a plurality of selection electrodes arranged in rows proximate to the apertures, each of said selection electrodes being electrically connected to a respective voltage tap of a resistive voltage divider; and
   f. means for effecting transport of the extracted electron currents toward said screen.

5. A display device comprising an envelope including a surface bearing a luminescent screen having a multiplicity of predefined areas and electron source means for selectively energizing respective ones of said areas to produce an image, characterized in that said display device comprises:
   a. at least one electron current transport duct defined by at least one wall comprising a material having a predetermined secondary emission coefficient;
   b. first electrode means arranged for producing a predetermined electric field within the at least one duct;
   c. electron producing means arranged for providing electrons in the at least one duct;
   said predetermined secondary emission coefficient and the arrangement of said first electrode means being chosen to effect an electron current in an operative length of the at least one duct;
   d. wall means having apertures disposed in communication with said predefined screen areas and the at least one duct;
   e. second electrode means for selectively effecting extraction of electron currents from the at least one duct, said second electrode means comprising a plurality of apertured selection electrodes, the apertures in said selection electrodes being aligned with respective ones of the apertures in said wall means, each of said selection electrodes being electrically connected to a respective voltage tap of a resistive voltage divider; and
   f. means for effecting transport of the extracted electron currents toward said screen.

* * * * *